(12) United States Patent
Gamada

(10) Patent No.: US 9,706,181 B2
(45) Date of Patent: Jul. 11, 2017

(54) PROJECTOR WITH A PLURALITY OF LIGHT SOURCES HAVING DIMMING CAPABILITIES

(71) Applicant: Panasonic Intellectual Property Management Co., Ltd., Osaka (JP)

(72) Inventor: Kouhei Gamada, Osaka (JP)

(73) Assignee: PANASONIC INTELLECTUAL PROPERY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/080,468

(22) Filed: Mar. 24, 2016

(65) Prior Publication Data

US 2016/0301903 A1 Oct. 13, 2016

(30) Foreign Application Priority Data

Apr. 10, 2015 (JP) ................................. 2015-081196

(51) Int. Cl.
*H04N 9/31* (2006.01)

(52) U.S. Cl.
CPC ......... *H04N 9/3155* (2013.01); *H04N 9/3102* (2013.01); *H04N 9/3164* (2013.01)

(58) Field of Classification Search
CPC .. G03B 21/2026; G03B 21/2053; H04N 9/31; H04N 9/3102; H04N 9/3155; H04N 9/3164; H05B 41/16; H05B 41/38; H05B 41/2887; H05B 41/2888; Y02B 20/22; Y02B 20/40; Y02B 20/144
See application file for complete search history.

(56) References Cited

U.S. PATENT DOCUMENTS

| 6,252,636 | B1 * | 6/2001 | Bartlett | H04N 9/3164 |
| | | | | 348/743 |
| 6,464,375 | B1 | 10/2002 | Wada et al. | |
| 8,022,348 | B2 | 9/2011 | Namba et al. | |
| 9,076,389 | B2 * | 7/2015 | Haraguchi | G09G 3/002 |
| 2002/0048172 | A1 | 4/2002 | Wada et al. | |

(Continued)

FOREIGN PATENT DOCUMENTS

| JP | 2000-003612 A | 1/2000 |
| JP | 2005-209572 A | 8/2005 |
| JP | 2008-269804 A | 11/2008 |

(Continued)

*Primary Examiner* — Sultan Chowdhury
(74) *Attorney, Agent, or Firm* — McDermott Will & Emery LLP

(57) ABSTRACT

A projector includes a plurality of light sources; a controller which controls dimming of the plurality of light sources individually; a light modulator which synthesizes light emitted from each of the plurality of light sources to generate synthetic light, and modulates the synthetic light to generate an optical image; and a projecting optical system which projects the optical image generated by the light modulator. The plurality of light sources include a first light source and a second light source, and when the controller causes the plurality of light sources to emit dimmed light, the controller causes the first light source to emit light with supplied power greater than or equal to 50% of rated power and causes the second light source to emit light with supplied power less than 50% of the rated power or turn off.

9 Claims, 10 Drawing Sheets

(56) References Cited

U.S. PATENT DOCUMENTS

2010/0026965 A1 2/2010 Namba et al.
2014/0293233 A1 10/2014 Shishido

FOREIGN PATENT DOCUMENTS

| JP | 2009-204646 A | 9/2009 |
| JP | 2010-026262 A | 2/2010 |
| JP | 2010-032944 A | 2/2010 |
| JP | 2010-033988 A | 2/2010 |
| JP | 2010-066368 A | 3/2010 |
| JP | 2014-209185 A | 11/2014 |

* cited by examiner

FIG. 3A

| POWER RATIO [%] | SUPPLIED POWER [W] | FLICKER |
|---|---|---|
| 100 (RATED POWER) | 310 | NO PROBLEM |
| 90 | 279 | NO PROBLEM |
| 80 | 248 | NO PROBLEM |
| 70 | 217 | NO PROBLEM |
| 60 | 186 | NO PROBLEM – FLICKER (SEVERELY) |
| 50 | 155 | NO PROBLEM – FLICKER (SEVERELY) |
| 40 | 124 | FLICKER (SLIGHTLY) |
| 30 | 93 | FLICKER (SLIGHTLY) |
| 20 | 62 | FLICKER (SLIGHTLY) |
| 10 | 31 | FLICKER (SLIGHTLY) |
| 5 | 15.5 | DIFFICULT TO MAINTAIN ARC DISCHARGE |
| 0 | 0 | |

FIG. 3B

| POWER RATIO | PROTRUDING SHAPE | | FLICKER |
|---|---|---|---|
| 100 % | 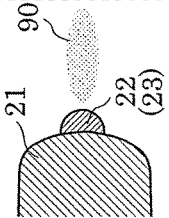 | ENTIRELY FUSED HEMISPHERICAL SHAPE | LUMINESCENT SPOT MOVED RANGE: NONE ⇒ FLICKER: NO PROBLEM |
| 90 % ~ 60 % | 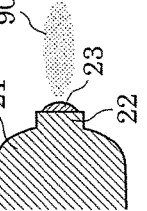 | ONLY ARC DISCHARGE SIDE FUSED ARC-LIKE SHAPE | LUMINESCENT SPOT MOVED RANGE: NONE ⇒ FLICKER: NO PROBLEM |
| 40 % ~ 55 % | 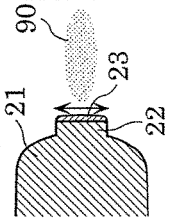 | ONLY ARC DISCHARGE SIDE FUSED VERY SHALLOW ARC-LIKE SHAPE | LUMINESCENT SPOT MOVED RANGE: LARGE ⇒ FLICKER: SEVERELY |
| SMALLER THAN 40 % | 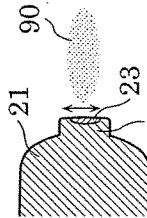 | ONLY PART OF ARC DISCHARGE SIDE FUSED VERY SHALLOW ARC-LIKE SHAPE | LUMINESCENT SPOT MOVED RANGE: SMALL ⇒ FLICKER: SLIGHTLY |

FIG. 4

| | LIGHT SOURCE 20a | LIGHT SOURCE 20b | LIGHT SOURCE 20c | LIGHT SOURCE 20d | SYSTEM BRIGHTNESS | FLICKER | SYSTEM FLICKER | DETERMINATION |
|---|---|---|---|---|---|---|---|---|
| CASE 1 | 70 % | 70 % | 70 % | 70 % | 280 % | 0.00 % | 0.00 % | OK |
| CASE 2 | 30 % | 70 % | 70 % | 70 % | 240 % | 1.50 % | 0.63 % | OK |
| CASE 3 | 30 % | 30 % | 70 % | 70 % | 200 % | 3.00 % | 1.50 % | OK |
| CASE 4 | 30 % | 30 % | 30 % | 70 % | 160 % | 4.50 % | 2.81 % | OK |
| CASE 5 | 30 % | 30 % | 30 % | 30 % | 120 % | 6.00 % | 5.00 % | NG |
| CASE 6 | 40 % | 40 % | 40 % | 40 % | 160 % | 8.00 % | 5.00 % | NG |

FIG. 5

| | LIGHT SOURCE 20a | LIGHT SOURCE 20b | LIGHT SOURCE 20c | LIGHT SOURCE 20d | SYSTEM BRIGHTNESS | FLICKER | SYSTEM FLICKER | DETERMINATION |
|---|---|---|---|---|---|---|---|---|
| CASE 1 | 60 % | 60 % | 60 % | 60 % | 240 % | 0.00 % | 0.00 % | OK |
| CASE 2 | 30 % | 60 % | 60 % | 60 % | 210 % | 1.50 % | 0.71 % | OK |
| CASE 3 | 30 % | 30 % | 60 % | 60 % | 180 % | 3.00 % | 1.67 % | OK |
| CASE 4 | 30 % | 30 % | 30 % | 60 % | 150 % | 4.50 % | 3.00 % | OK |
| CASE 5 | 30 % | 30 % | 30 % | 30 % | 120 % | 6.00 % | 5.00 % | NG |

FIG. 6

| | LIGHT SOURCE 20a | LIGHT SOURCE 20b | SYSTEM BRIGHTNESS | FLICKER | SYSTEM FLICKER | DETERMINATION |
|---|---|---|---|---|---|---|
| CASE 1 | 60 % | 60 % | 120 % | 0.00 % | 0.00 % | OK |
| CASE 2 | 30 % | 60 % | 90 % | 1.50 % | 1.67 % | OK |
| CASE 3 | 30 % | 30 % | 60 % | 3.00 % | 5.00 % | NG |
| CASE 4 | 40 % | 50 % | 90 % | 2.00 % | 2.22 % | OK |
| CASE 5 | 40 % | 40 % | 80 % | 4.00 % | 5.00 % | NG |

PROJECTOR WITH A PLURALITY OF LIGHT SOURCES HAVING DIMMING CAPABILITIES

CROSS REFERENCE TO RELATED APPLICATION

This application claims the benefit of priority of Japanese Patent Application Number 2015-081196 filed on Apr. 10, 2015, the entire content of which is hereby incorporated by reference.

BACKGROUND

1. Technical Field

The present disclosure relates to a projector.

2. Description of the Related Art

Projectors including a plurality of light sources are conventionally known (e.g., Patent Literature (PTL) 1: Japanese Unexamined Patent Application Publication No. 2009-204646 and PTL 2: Japanese Unexamined Patent Application Publication No. 2010-066368). Conventional projectors synthesize light emitted from each of the light sources to generate synthetic light, and project the synthetic light. By doing so, the conventional projectors realize a projection image with high luminance.

Meanwhile, there are cases where high luminance is not required for a projection image depending on a use environment of projectors. For example, when a projector is used in a small space such as in a small meeting room, dim-light emission is performed from the perspective of power saving PTL 3: Japanese Unexamined Patent Application Publication No. 2008-269804). In the dim-light emission, a light source of a projector is caused to emit light with supplied power less than rated power. Alternatively, a method of suppressing luminance of a projection image by causing a light source to emit light with rated power and shielding a portion of light emitted from the light source using a shield component (e.g., PTL 4: Japanese Unexamined Patent Application Publication No. 2014-209185).

SUMMARY

However, the projector described in PTL 3 poses a problem of occurrence of flicker in a projection image. Flicker occurring in a projection image increases particularly when the supplied power is sufficiently less than the rated power. Moreover, the projector described in PTL 4 merely shields a portion of light emitted from the light source, and poses a problem that power saving cannot be realized.

In view of the above, an object of the present disclosure is to provide a projector capable of suppressing occurrence of flicker in a projection image and realizing power saving.

In order to achieve the above-described object, a projector according to an aspect of the present disclosure includes: a plurality of light sources; a controller which controls dimming of the plurality of light sources individually; a light modulator which synthesizes light emitted from each of the plurality of light sources to generate synthetic light, and modulates the synthetic light to generate an optical image; and a projecting optical system which projects the optical image generated by the light modulator, wherein the plurality of light sources includes a first light source and a second light source, and when the controller causes the plurality of light sources to emit dimmed light, the controller causes the first light source to emit light with supplied power greater than or equal to 50% of rated power and causes the second light source to emit light with supplied power less than 50% of the rated power or turn off.

According to the present disclosure, it is possible to suppress occurrence of flicker in a projection image and realize power saving.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 3A is a diagram illustrating a degree of flicker for each supplied power provided to a light source of the projector according to the embodiment of the present disclosure;

FIG. 3B is a diagram illustrating changes in the shape of an electrode for each supplied power provided to the light source of the projector according to the embodiment of the present disclosure;

FIG. 4 is a diagram illustrating the degrees of flicker when the projector (four-light system) according to the embodiment of the present disclosure emits dimmed light (70% and 30%);

FIG. 5 is a diagram illustrating the degrees of flicker when the projector (four-light system) according to the embodiment of the present disclosure emits dimmed light (60% and 40%);

FIG. 6 is a diagram illustrating the degrees of flicker when the projector (two-light system) according to the embodiment of the present disclosure emits dimmed light;

DETAILED DESCRIPTION OF THE EMBODIMENT

Figure 1:
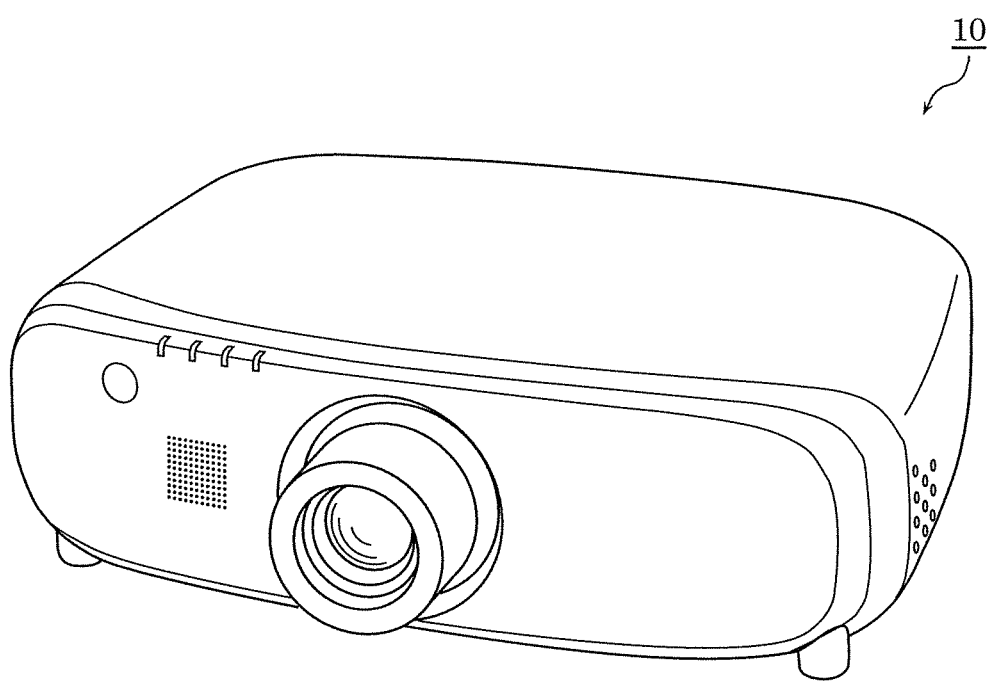
FIG. 1 is a perspective overview of a projector according to an embodiment of the present disclosure.

The following describes in detail a projector according to an embodiment of the present disclosure, with reference to the drawings. It should be noted that the subsequently-described embodiment shows a specific example of the present disclosure. The numerical values, shapes, materials, structural components, the disposition and connection of the structural components, etc. described in the following embodiment are mere examples, and do not intend to limit the present disclosure. Furthermore, among the structural components in the following embodiment, components not recited in the independent claim which indicates the broadest concept of the present invention are described as arbitrary structural components.

In addition, each diagram is a schematic diagram and not necessarily strictly illustrated. Additionally, the same structural components share the same reference numerals in each diagram.

Embodiment

[Configuration]

Figure 2:
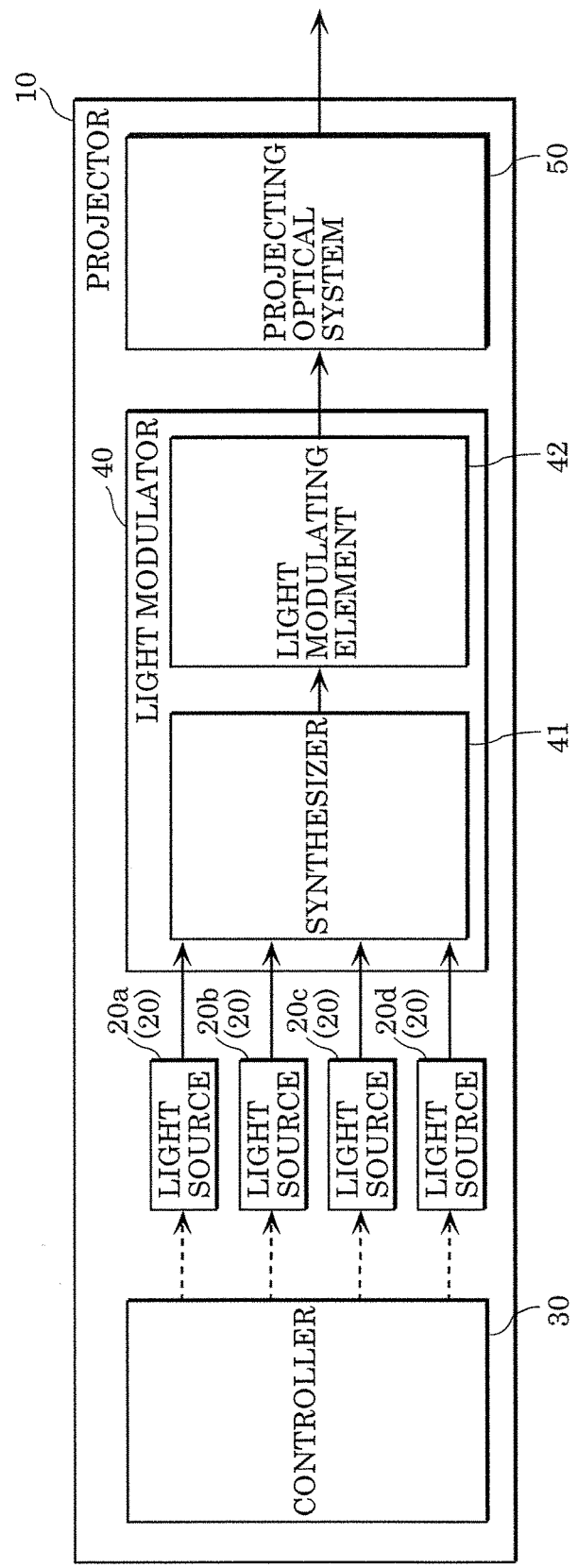
FIG. 2 is a block diagram illustrating a configuration of the projector according to the embodiment of the present disclosure.

First, an outline of a projector according to the present embodiment shall be described with reference to FIG. 1 and FIG. 2. FIG. 1 is a perspective overview of projector 10 according to the present embodiment. FIG. 2 is a block diagram illustrating a configuration of projector 10 according to the present embodiment. It should be noted that, in FIG. 2, dashed arrows denote control signals for controlling structural components (specifically, light sources 20) included in projector 10, and solid arrows denote light emitted by each of the structural components.

Projector 10 illustrated in FIG. 1 projects an image or video, as an optical image, onto a projection surface such as a screen to display the image or the video. Projector 10 is a projector of a multi-light system including a plurality of light sources.

As illustrated in FIG. 2, projector 10 includes a plurality of light sources 20; controller 30, light modulator 40, and projecting optical system 50. More specifically, projector 10 is a projector of a four-light system including four light sources 20a to 20d. It should be noted that, in the following description, light sources 20a to 20d shall be collectively described as light source 20 when light sources 20a to 20d are not specifically distinguished.

Projector 10 according to the present embodiment is capable of emitting dimmed light. More specifically, projector 10 selectively executes a full-lighting mode or a dim-lighting mode. In the full-lighting mode, light sources 20 each emit light with rated power. In the dim-lighting mode, at least one of light sources 20 is caused to emit light with supplied power less than the rated power or to turn off.

The following describes in detail each of the structural components of projector 10.

[Light Source]

Light source 20 is one of the light sources included by projector 10. Light source 20 is an electric-discharge lamp which, for example, utilizes arc discharge characteristics. More specifically, light source 20 is a high-pressure mercury lamp, but light source 20 is not limited to such a lamp. Light source 20 may be a metal halide lamp, a xenon lamp, etc.

Light source 20 includes, for example, an arc tube (not illustrated) filled with filler gas, and a pair of electrodes (not illustrated) disposed inside the arc tube. The arc tube is formed of, for example, fused quartz. The filler gas is mercury, for example, and the amount of filled gas is in a range from 10 mg to 100 mg, for instance. It should be noted that, instead of or in addition to mercury, noble gas or halogen may be used as the filler gas. Argon, xenon, krypton, or a mixed gas of these gases may be used as the noble gas. Iodine, bromine, or a mixed gas of these gases may be used as the halogen. The pair of electrodes is formed of tungsten, for example. The distance between the electrodes of the pair of electrodes is in a range from 0.5 mm to 2.0 mm, for example.

The rated power of light source 20 is 310 W, for example. According to the present embodiment, four light sources 20a to 20d each have the same configuration. Thus, the four light sources 20a to 20d each have the rated power of 310 W. When the four light sources 20a to 20d are each supplied with the same supplied power, light sources 20a to 20d emit light having the same light intensity and color.

Light source 20 is controlled by controller 30, thereby enabling emitting dimmed light. More specifically, light source 20 is capable of emitting light with power less than the rated power. With this, it is possible to suppress power consumption. It should be noted that, when light source 20 emits dimmed light, flicker (i.e., variation in illuminance of emitted light) occurs according to the supplied power. The relation between the dim-light emission and the flicker shall be described later with reference to FIG. 3A and FIG. 3B.

[Controller]

Controller 30 controls dimming of the plurality of light sources 20 individually. Controller 30 includes a non-volatile memory in which a program is stored, a volatile memory that is a temporal storage area for executing the program, an input-output port, a processor which executes the program, etc. Controller 30 is implemented by a microcontroller, for example.

According to the present embodiment, controller 30 controls dimming of the four light sources 20a to 20d individually. The control of dimming includes not only dimming of light source 20 (adjustment of light intensity) but also control of light emission and light extinction of light source 20. More specifically, controller 30 controls dimming of light source 20 by adjusting a power ratio. The power ratio is a ratio of supplied power to rated power of light source 20. For example, controller 30 outputs a control signal (dimming signal) indicating supplied power to each of the plurality of light sources 20, or to a power supply (not illustrated) that supplies power to the plurality of light sources 20. Light sources 20 each emit light with supplied power indicated by the control signal output from controller 30 or turn off.

According to the present embodiment, when controller 30 causes light sources 20 to emit dimmed light, (i) causes the first light source among the plurality of light sources to emit light with supplied power greater than or equal to 50% of rated power and (ii) causes the second light source among the plurality of light sources to emit light with supplied power less than 50% of the rated power or turn off. The second light source is a light source different from the first light source. More specifically, controller 30 selects at least one of light sources 20 (light source 20a, for instance) as the first light source, and causes the selected light source 20 to emit light with supplied power greater than or equal to 50% of the rated power. Furthermore, controller 30 selects at least one of the rest of light sources 20 (light sources 20b to 20d, for instance) as a second light source, and causes the selected light source 20 to emit light with supplied power less than 50% of the rated power.

For example, when controller 30 causes light sources 20 to emit dimmed light; that is, when executing the dim-lighting mode, selectively executes a plurality of dimming modes. The combination of supplied power to be supplied to light sources 20 differ from one another among the plurality of dimming modes.

For example, the first dimming mode, which is one of the plurality of dimming modes, is a mode for causing the first light source (light sources 20a and 20b, for instance) to emit light with supplied power greater than or equal to 50% of the rated power, and causing the second light source (light sources 20c and 20d, for instance) to emit light with supplied power less than 50% of the rated power or turn off. The second dimming mode, which is one of the plurality of dimming modes, is a mode for causing the second light source (light sources 20c and 20d, for instance) to emit light with supplied power greater than or equal to 50% of the rated power, and causing the first light source (light sources 20a and 20b, for instance) to emit light with supplied power less than 50% of the rated power or turn off.

In sum, a light source which is caused to emit light with high supplied power (i.e., a light source which is shallowly dimmed) and a light source which is caused to emit light with low supplied power (i.e., a light source which is deeply dimmed or turned off) are switched between the first dimming mode and the second dimming mode. For example, controller 30 selectively executes the first dimming mode and the second dimming mode. With this, it is possible to prevent a specific light source from being continuously supplied with low supplied power, enabling extending a product life of light sources 20. Specific operations for the dim-light emission shall be described later with reference to FIG. 7 to FIG. 9.

According to the present embodiment as described above, when controller 30 causes light sources 20 to emit dimmed light, controller 30 sets supplied power for at least one of light sources 20 to be different from supplied power for the rest of light sources 20, instead of evenly reducing supplied power for the respective light sources 20. Specifically, controller 30 greatly decreases supplied power (deep dimming) for at least one of light sources 20, and slightly decreases at least one of the rest of light sources 20 (shallow dimming).

[Light Modulator]

Light modulator 40 synthesizes light emitted from each of light sources 20 to generate synthetic light, and modulates the synthetic light to generate an optical image. Specifically, light modulator 40 includes synthesizer 41 and light modulating element 42.

Synthesizer 41 includes a plurality of optical components (not illustrated). For example, the plurality of optical components synthesize light emitted from each of light sources 20 to generate synthetic light, and emit the synthetic light onto light modulating element 42. The plurality of optical components include, for example, a mirror, a prism, a lens, a rod integrator, etc.

Light modulating element 42 modulates the synthetic light based on an image signal to generate an optical image (i.e., a projection image). Light modulating element 42 is, for example, a digital micromirror device (DMD). In other words, projector 10 is a digital light processing (DLP) projector.

Alternatively, light modulating element 42 may be a transmissive liquid crystal panel, for example. In other words, projector 10 according to the present embodiment may be a liquid crystal projector. Alternatively, light modulating element 42 may be a reflective liquid crystal panel. In other words, projector 10 may be a liquid crystal on silicon (LCOS) projector.

[Projecting Optical System]

Projecting optical system 50 projects the optical image generated by light modulator 40. Specifically, projecting optical system 50 includes a projection lens (not illustrated). Projecting optical system 50 projects an optical image onto a projection surface such as a screen, thereby displaying a projection image on the screen.

[Light Source and Flicker]

The following describes the relation between light source 20 and flicker for each supplied power, with reference to FIG. 3A. FIG. 3A is a diagram illustrating a degree of flicker for each supplied power provided to light source 20 of projector 10 according to the embodiment of the present disclosure. More specifically, FIG. 3A illustrates a result of visually measuring the degree of flicker that occurs in a high-pressure mercury lamp with rated power of 310 W, while varying the supplied power.

In FIG. 3A, flicker is indicated by three levels of "no problem", "flicker (slightly)", and "flicker (severely)" according to the degree of flicker (degree of conspicuity). The level of "no problem" indicates that flicker is sufficiently suppressed and visually unnoticeable. The levels of "flicker (slightly)" and "flicker (severely)" each indicate that flicker is visually noticeable, posing a difficulty for normal use of the projector.

As indicated by FIG. 3A, there is a tendency for the flicker to be suppressed when the power ratio is greater than or equal to 50%, and to occur when the power ratio is less than 50%, with the power ratio of 50% as boundary. FIG. 3A also shows that the flicker occurs most severely when the power ratio is around 50%.

More specifically, when the power ratio is in the range from 70% to 100%, the degree of flicker is "no problem". In addition, although not illustrated, the degree of flicker is also "no problem" when the power ratio is greater than or equal to 65%.

Moreover, when the power ratio is in the range from 50% to 60%, the degree of flicker is "no problem—flicker (severely)". More specifically, the flicker occurs most severely when the power ratio is 55%. It should be noted that the degree of flicker ranges from "no problem" to "flicker (severely)" when the power ratio is in a range from 50% to 60%, because the degree of suppressing flicker has a range according to a difference in current waveforms from controller 30.

When the power ratio is in the range from 20% to 40%, the degree of flicker is "flicker (slightly)". It should be noted that when the power ratio is less than 10%, arc discharge is difficult to be maintained. When the power ratio is less than 5%, for example, the arc discharge cannot be maintained and light source 20 fades out.

In order to maintain the arc discharge, it is necessary to ensure sufficient thermionic electron emission from a cathode. In other words, it is necessary that the cathode temperature is sufficiently high. When the power ratio is excessively low, the cathode temperature cannot be maintained sufficiently high, and thus the arc discharge is considered to be impossible to be maintained.

It should be noted that light source 20 is designed, in general, to have a constant electrode temperature regardless of rated power. Accordingly, although light source 20 with the rated power of 310 W is used in the present embodiment, results equivalent to the results illustrated in FIG. 3A are obtained even when, for example, light source 20 with the rated power of 200 W is used. In other words, the occurrence of flicker depends not on the absolute value of supplied power but on the power ratio (=supplied power/rated power).

Here, the reason why the degree of flicker varies according to supplied power (power ratio) shall be briefly explained with reference to FIG. 3B. FIG. 3B is a diagram illustrating changes in the shape of electrode 21 for each supplied power provided to light source 20 of projector 10 according to the embodiment of the present disclosure. In FIG. 3B, only one of a pair of electrodes 21 included in light source 20 is illustrated.

Light source 20 according to the present embodiment includes electrode 21 having protrusion 22 at an end thereof. When arc discharge 90 is generated by applying a voltage between the pair of electrodes 21, protrusion 22 fuses due to a current flowing through electrode 21.

The greater the supplied power is, the more fused portion 23 of protrusion 22 enlarges, and fused portion 23 is formed into a substantially hemispherical shape due to surface extension. When the power ratio is 100% as illustrated in FIG. 3B, for example, protrusion 22 entirely fuses to form fused portion 23 into a hemispherical shape. At this time, a luminescent spot of arc discharge 90 stabilizes in the vicinity of a top of hemispherically shaped protrusion 22, and thus occurrence of flicker is suppressed. In other words, the occurrence of flicker is more suppressed as the supplied power is greater, as illustrated in FIG. 3A and FIG. 3B.

When the supplied power decreases, a portion distant from arc discharge 90 in protrusion 22 cools and consolidates into a cylindrical shape. For example, when the power ratio is in a rage from 60% to 90%, the cross-section surface of fused portion 23 facing arc discharge 90 has a shallow arc-like shape. As the power decreases, the proportion of cylindrical portion of protrusion 22 increases, and the shape of fused portion 23 becomes shallower.

When the supplied power is 50% of the rated power, fused portion 23 facing arc discharge 90 has a significantly shallow arc-like shape. This leads to an unstable state where the luminescent spot of arc discharge 90 is movable at any position in the arc-like shape, significantly increasing a moved distance and flicker.

Meanwhile, when the supplied power further decreases, a portion surrounding the shallow arc-like shape facing arc discharge 90 gradually consolidates. As a result, fused portion 23 facing arc discharge 90 becomes narrower, the moved distance of the luminescent spot of arc discharge 90 becomes relatively small, and the degree of flicker rather decreases. Accordingly, as illustrated in FIG. 3B, flicker is suppressed compared to the case where the power ratio is 50%. More specifically, when light source 20 is caused to emit light with supplied power in a range from 20% to 40% of the rated power, flicker decreases compared to the case where light source 20 is caused to emit light with supplied power greater than 40% of the rated power and 55% or less of the rated power.

In view of the above-described results, according to the present embodiment, when controller 30 causes light sources 20 to emit dimmed light, (i) causes the first light source among light sources 20 to emit light with supplied power greater than or equal to 50% of rated power and (ii) causes the second light source among light sources 20 to emit light with supplied power less than 50% of the rated power or turn off. More specifically, when controller 30 causes light sources 20 to emit dimmed light, (i) causes the first light source to emit light with high supplied power that is less likely to cause flicker (for example, the power ratio greater than or equal to 50%) and (ii) causes the second light source to emit light with low supplied power that causes flicker (for example, the power ratio less than 50%).

In this manner, although flicker occurs in light emitted from the second light source, it is possible to realize power saving, by reducing the supplied power to the second light source. Meanwhile, it is possible to reduce the proportion of light emitted from the second light source to synthetic light of light sources 20, by increasing the supplied power to the first light source. Accordingly, flicker of light emitted from the second light source becomes less conspicuous, it is possible to suppress occurrence of flicker in a projection image.

Alternatively, controller 30 may cause the first light source to emit light with supplied power greater than or equal to 65% of the rated power, for example. With this, since flicker is sufficiently suppressed when the power ratio is greater than or equal to 65% as illustrated in FIG. 3A, it is possible to further prevent occurrence of flicker of light emitted from the first light source. Accordingly, it is possible to further suppress occurrence of flicker in a projection image.

Alternatively, controller 30 may cause the second light source to emit light with supplied power in a range from 20% to 40% of the rated power. With this, although partly flicker occurs when the power ratio is in a range from 20% to 40% as illustrated in FIG. 3A, the degree of occurrence of flicker is suppressed compared to the case where the power ratio is 50%, for example. Accordingly, it is possible to suppress flicker of light emitted from the second light source. Accordingly, it is possible to suppress occurrence of flicker in a projection image.

Alternatively, controller 30 may cause all of light sources 20 to emit light with supplied power greater than or equal to 5% of the rated power. With this, since arc discharge can be maintained when the power ratio is greater than or equal to 5% as illustrated in FIG. 3A, it is possible to suppress occurrence of fading out of light source 20.

By the way, when, among light sources 20, the second light source is caused to turn off while the first light source is caused to emit light, it is difficult to cause the second light source to immediately emit light again. This is because the filler gas (mercury) filled in the high-pressure mercury lamp has a high steam pressure. Accordingly, it is possible to cause light source 20 to stably emit light, by suppressing occurrence of fading out of light source 20.

EXAMPLES

The following describes, with reference to FIG. 4 to FIG. 6, examples of the case where light sources 20a to 20d are each caused to emit light based on the result of visually observing flicker illustrated in FIG. 3A and FIG. 3B.

FIG. 4 to FIG. 6 are diagrams each illustrating the degrees of flicker when projector 10 emits dimmed light according to the present embodiment. More specifically, FIG. 4 and FIG. 5 each illustrate the degree of flicker when projector 10 which is four-light system and includes four light sources 20a to 20d emits dimmed light. FIG. 6 illustrates the degree of flicker when a projector which is two-light system and includes two light sources 20a and 20b emits dimmed light.

FIG. 4 to FIG. 6 each illustrates the power ratio (=supplied power/rated power) of each of light sources 20a to 20d for each case. System brightness indicates a total of power ratios of light sources 20a to 20d. In other words, the system brightness corresponds to the brightness of synthetic light or the brightness of a projection image (optical image). The lower the system brightness is, the more power saving can be realized. Although a loss in light intensity occurs in an actual synthesis optical system, the amount of loss is considered to be constant in each lamp. Accordingly, the loss in light intensity has no practical impact on the result of this case, and thus description will be omitted.

Flicker indicates a total amount of flicker occurring in the system. Here, it is considered that flicker does not occur when light source 20 is caused to emit light with supplied power greater than or equal to 50% of the rated power, and flicker of 5% occurs when light source 20 is caused to emit light with supplied power less than 50% of the rated power. It should be noted that flicker of 5% means that illuminance change of 5% occurs with respect to light emitted from light source 20.

System flicker is a ratio of flicker with respect to the system brightness. Determination is a result of determining indicating whether or not the system flicker is suppressed. More specifically, flicker is determined as being unsuppressed (NG) when the system flicker is greater than a predetermined threshold, and flicker is determined as being suppressed (OK) when the system flicker is less than or equal to the predetermined threshold. Flicker is generally considered to be visually noticeable when the flicker exceeds 3%, and thus the threshold is set to 3%.

[Four-Light System Projector]

Case 1 to Case 5 in FIG. 4 indicate the cases where the supplied power is 70% at shallow dimming and 30% at deep dimming. Since flicker of 5% occurs in light emitted from the second light source which is dimmed deeply, flicker of 1.50% (=30%×0.05) occurs for each second light source.

Case 1 indicates a comparison example in which all of the four light sources 20a to 20d are caused to emit light at a power ratio of 70%. The system brightness is 280% in this case, and power saving is not sufficiently realized. In view of this, Case 2 to Case 5 indicate the cases where, in order to realize further power saving, one to four light sources among the four light sources 20a to 20d are caused to emit light at a power ratio of 30%.

In Case 2, only light source 20a is caused to emit light at a power ratio of 30%. More specifically, in Case 2, three light sources 20b to 20d out of the four light sources 20a to 20d are the first light sources, and light source 20a is solely the second light source. The system brightness is 240% in this case, and flicker of 1.50% occurred. The system flicker is 0.63% (=1.50%/240%×100), which means that the system flicker is sufficiently suppressed.

In Case 3, two light sources 20a and 20b are caused to emit light at a power ratio of 30%. More specifically, in Case 3, two light sources 20c and 20d out of the four light sources 20a to 20d are the first light sources, and light sources 20a and 20b are the second light sources. The system brightness is 200% in this case, and flicker of 3.00% occurred. The system flicker is 1.50% (=3.00%/200%×100), which means that the system flicker is sufficiently suppressed.

In Case 4, three light sources 20a to 20c are caused to emit light at a power ratio of 30%. More specifically, in Case 4, one light source 20d out of the four light sources 20a to 20d is the first light source, and the three light sources 20a to 20c are the second light sources. The system brightness is 160% in this case, and flicker of 4.50% occurred. The system flicker is 2.81% (=4.50%/160%×100), which means that the system flicker is sufficiently suppressed.

Case 5 indicates a comparison example in which all of the four light sources 20a to 20d are caused to emit light at a power ratio of 30%. The system brightness is 120% in this case, and flicker of 6.00% occurred. The system flicker is 5.00% (=6.00%/120%×100), which means that the system flicker is unsuppressed.

As described above, among the four light sources 20a to 20d, at least one light source is caused to emit light at a power ratio of 30% (i.e., less than 50%), and at least one of the other light sources is caused to emit light at a power ratio of 70% (i.e., greater than or equal to 50%). This allows suppressing occurrence of flicker and realizing power saving.

Case 6 indicates a comparison example in which all of the four light sources 20a to 20d are caused to emit light at a power ratio of 40%. The system brightness is 160% in this case, and flicker of 8.00% occurred. The system flicker is 5.00% (=8.00%/160%×100), which means that the system flicker is unsuppressed.

As the comparison between Case 4 and Case 6 shows, although the system brightness is 160% in both cases, the system flicker is suppressed in Case 4 whereas the system flicker is unsuppressed in Case 6. In other words, in order to realize a certain level of power saving, the supplied power for at least one of the light sources is reduced and the supplied power for at least one of the other light sources is maintained at a high level, rather than evenly reducing the supplied power for all of the light sources, thereby enabling suppressing the system flicker.

Case 1 to Case 5 in FIG. 5 indicate the cases where the supplied power is 60% at shallow dimming and 30% at deep dimming. Since flicker of 5% occurs in light emitted from the second light source which is dimmed deeply, flicker of 1.50% (=30%×0.05) occurs for each of the second light sources.

In the example illustrated in FIG. 5 as with FIG. 4, among the four light sources 20a to 20d, at least one light source is caused to emit light at a power ratio of 30% (i.e., less than 50%) and at least one of the other light sources is caused to emit light at a power ratio of 60% (i.e., greater than or equal to 50%), thereby enabling suppressing of occurrence of flicker and realizing power saving.

For example, as the comparison between Case 4 in FIG. 4 and Case 4 in FIG. 5 shows, the system flicker can be more suppressed when the supplied power for light source 20d (the first light source) is greater. Accordingly, in terms of suppressing flicker, the supplied power for the first light source may be greater. On the other hand, the system brightness decreases as the supplied power for light source 20d is lower. Accordingly, from the perspective of power saving, the supplied power for the first light source may be lower.

[Two-Light System Projector]

Case 1 to Case 3 in FIG. 6 indicate the cases where the supplied power is 60% at shallow dimming and 30% at deep dimming. Since flicker of 5% occurs in light emitted from the second light source which is dimmed deeply, flicker of 1.50% (=30%×0.05) occurs for each of the second light sources.

Case 4 and Case 5 in FIG. 6 indicate the cases where the supplied power is 50% at shallow dimming and 40% at deep dimming. Since flicker of 5% occurs in light emitted from the second light source which is dimmed deeply, flicker of 2.00% (=40%×0.05) occurs for each of the second light sources.

Case 1 indicates a comparison example in which two light sources 20a and 20b are caused to emit light at a power ratio of 70%. The system brightness is 120% in this case, and power saving is not sufficiently realized. In view of this, in order to realize further power saving, one of the two light sources 20a and 20b is caused to emit light at a power ratio of 30% in Case 2.

In Case 2, light source 20a is caused to emit light at a power ratio of 30%. More specifically, in Case 2, among the two light sources 20a and 20b, light source 20b is the first light source, and light source 20a is the second light source. The system brightness is 90% in this case, and flicker of 1.50% occurred. The system flicker is 1.67% (=1.50%/90%×100), which means that the system flicker is sufficiently suppressed.

Case 3 indicates a comparison example in which two light sources 20a and 20b are caused to emit light at a power ratio of 30%. The system brightness is 60% in this case, and flicker of 3.00% occurred. The system flicker is 5.00% (=3.00%/60%×100), which means that the system flicker is unsuppressed.

In Case 4, light source 20a is caused to emit light at a power ratio of 40%. More specifically, in Case 4, among the two light sources 20a and 20b, light source 20b is the first light source, and light source 20a is the second light source. The system brightness is 90% in this case, and flicker of 2.00% occurred. The system flicker is 2.22% (=2.00%/90%× 100), which means that the system flicker is sufficiently suppressed.

Case 5 indicates a comparison example in which two light sources 20a and 20b are caused to emit light at a power ratio of 40%. The system brightness is 80% in this case, and flicker of 4.00% occurred. The system flicker is 5.00% (=4.00%/80%×100), which means that the system flicker is unsuppressed.

As described above, among the two light sources 20a and 20b, one is caused to emit light with a low supplied power and the other is caused to emit light with a high supplied power, thereby enabling suppressing of occurrence of flicker and realizing power saving.

It should be noted that comparison between Case 2 and Case 4 in FIG. 6 shows that it is possible to further suppress the system flicker when the supplied power for light source 20a (the second light source) is further decreased and the supplied power for light source 20b (the first light source) is further increased. Accordingly, controller 30 is capable of further suppressing occurrence of flicker by further decreasing the supplied power for the first light source and further increasing the supplied power for the second light source.

[Operation]

Figure 7:
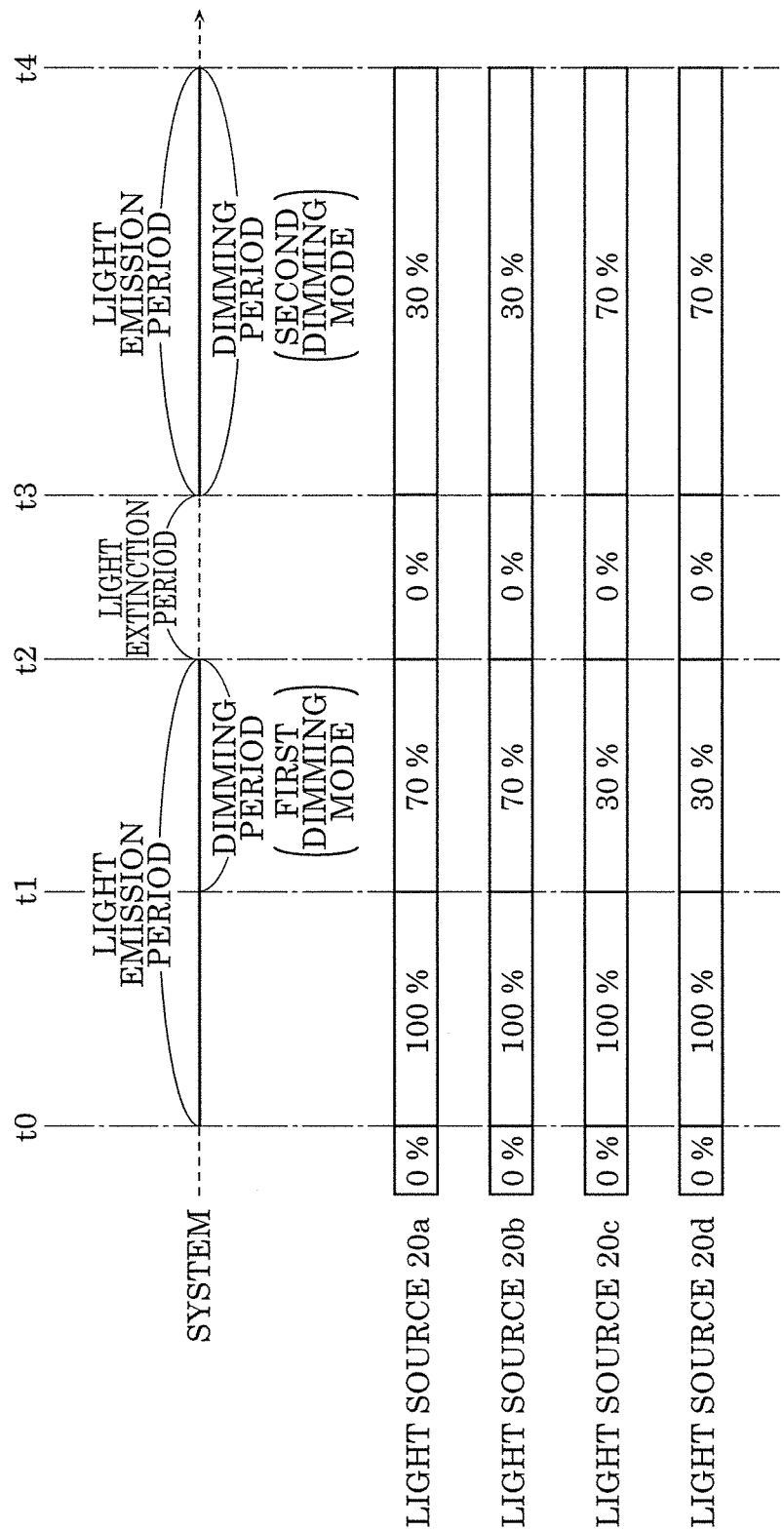
FIG. 7 is a timing chart illustrating an example of operations of the projector according to the embodiment of the present disclosure.
Figure 8:
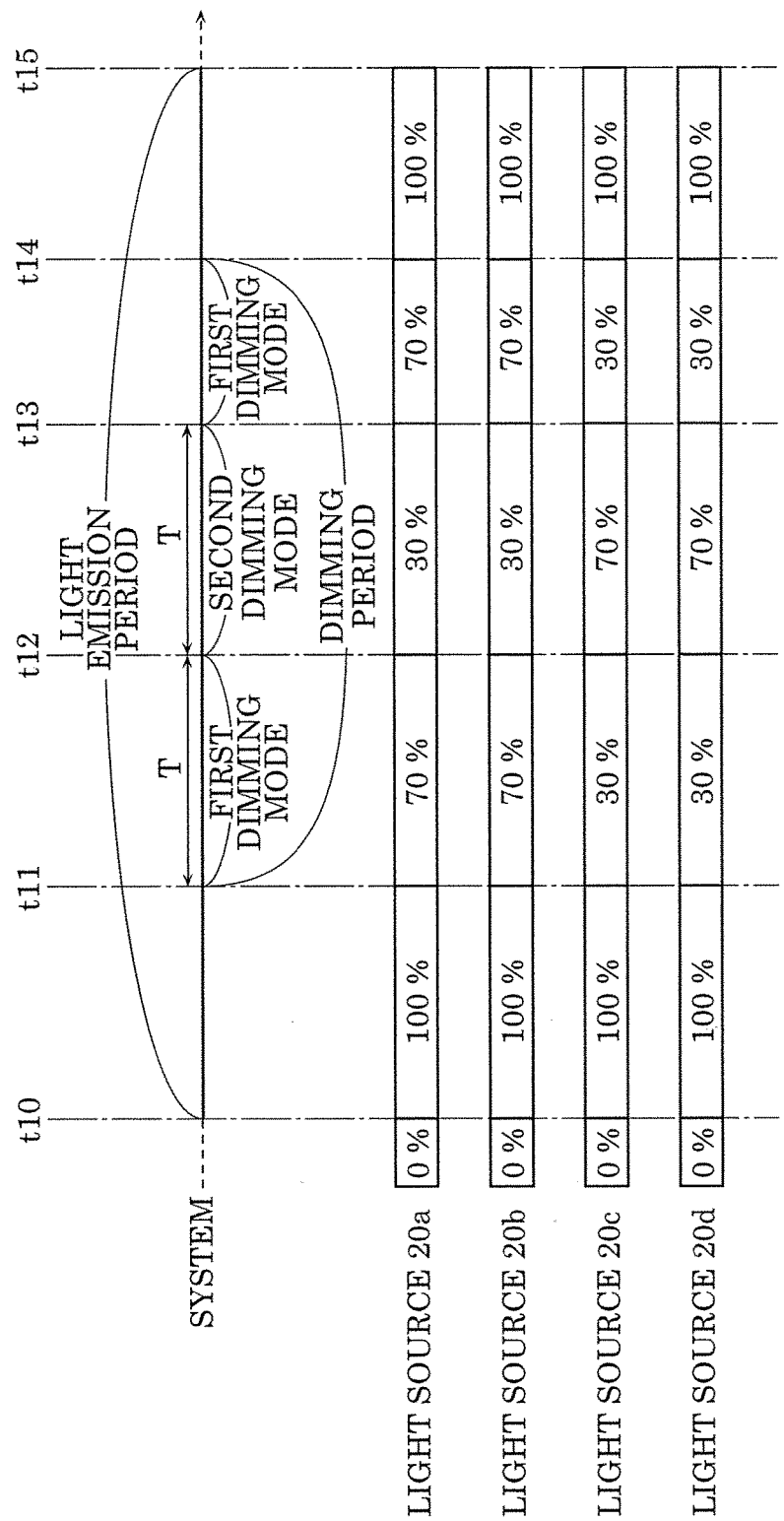
FIG. 8 is a timing chart illustrating another example of operations of the projector according to the embodiment of the present disclosure.
Figure 9:
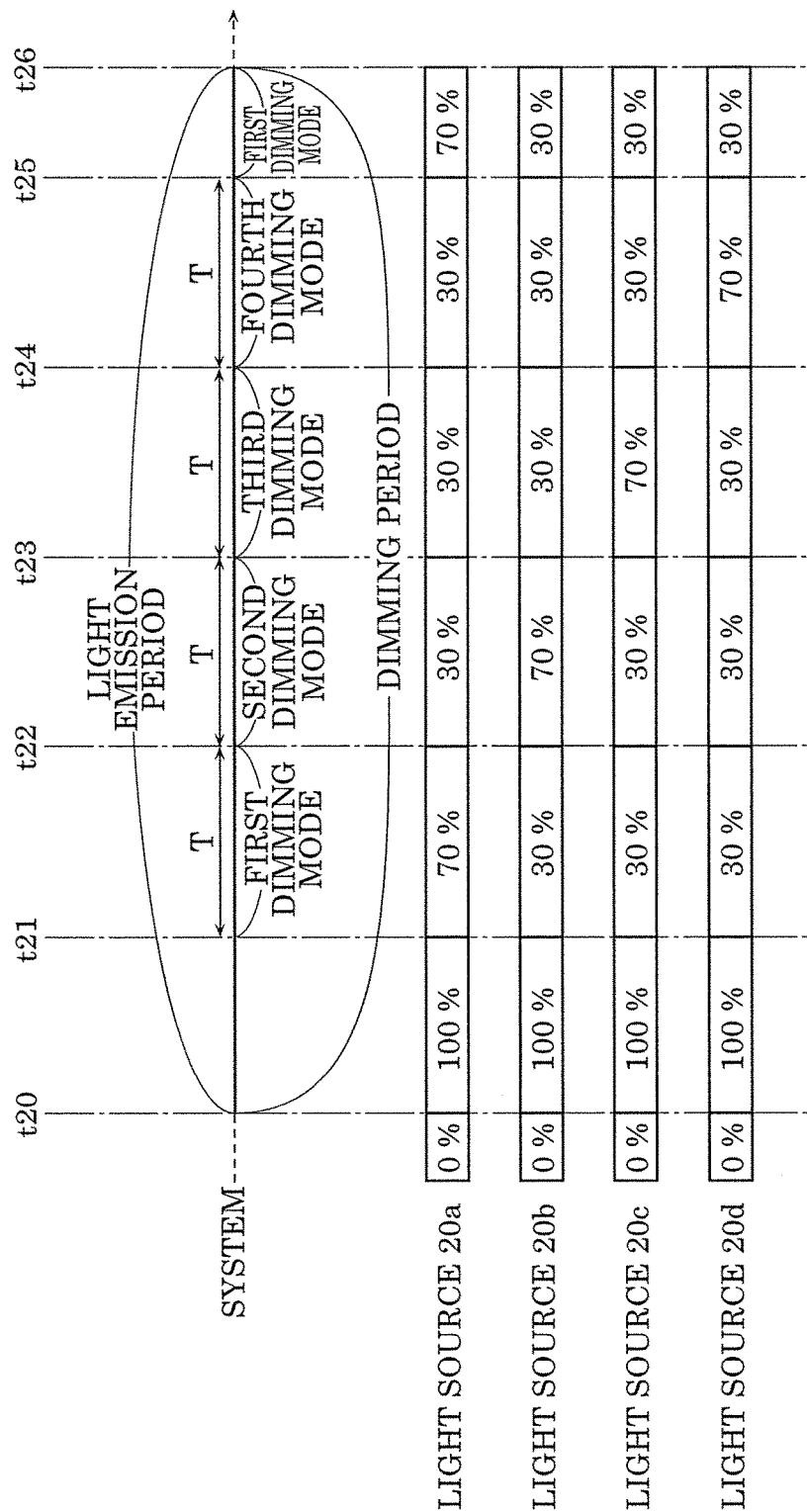
FIG. 9 is a timing chart illustrating yet another example of operations of the projector according to the embodiment of the present disclosure.

Here, operations of projector 10 according to the present embodiment shall be described with reference to FIG. 7 to FIG. 9. FIG. 7 to FIG. 9 are timing charts each illustrating an example of operations of projector 10 according to the present embodiment.

Light emission period in each of FIG. 7 to FIG. 9 is a period from power on to power off of projector 10. In other words, the light emission period is a period during which light sources 20 of projector 10 continuously emit light. Specifically, projector 10 operates in a full-lighting mode or a dim-lighting mode during the light emission period.

Dimming period is a period during which projector 10 operates in the dim-lighting mode.

It should be noted that switching between the full-lighting mode and the dim-lighting mode is carried out based on, for example, an instruction from a user or an image signal provided. For example, when an image signal having small luminance, such as an image signal for displaying a black image screen, is provided, controller 30 switches from the full-lighting mode to the dim-lighting mode.

Light extinction period is a period from power off to power on of projector 10. In other words, all of light sources 20 included in projector 10 are turned off in the light extinction period.

In the present embodiment as described above, controller 30 selectively executes a plurality of dimming modes in the dim-lighting mode. The timing of switching between the dimming modes includes, for example, two manners as described below.

Switching for Each Light Emission Period

In the first manner, controller 30 switches from the first dimming mode to the second dimming mode when controller 30 causes all of light sources 20 to turn off and subsequently causes at least one of light sources 20 to emit light. Detailed description shall be given with reference to an example illustrated in FIG. 7.

In the example illustrated in FIG. 7, projector 10 is powered on at time t0 and the light emission period starts. More specifically, controller 30 causes four light sources 20a to 20d to emit light with rated power (i.e., the full-lighting mode).

At time t1, for example, an image signal for a black screen image is inputted, and controller 30 executes the dim-lighting mode. At this time, controller 30 executes the first dimming mode. For example, controller 30 causes light sources 20a and 20b to emit light with supplied power of 70% of the rated power, and causes light sources 20c and 20d to emit light with supplied power of 30% of the rated power. In other words, the first light sources are light sources 20a and 20b and the second light sources are light sources 20c and 20d.

Projector 10 is powered off at time t2 to end the light emission period and the light extinction period starts. In the light extinction period, all of the four light sources 20a to 20d are turned off.

Projector 10 is powered on at time t3 and the light emission period starts. Here, for example, the dimming period stars together with the start of the light emission period. Controller 30 executes the second dimming mode. More specifically, controller 30 causes light sources 20a and 20b to emit light with supplied power of 30% of rated power, and causes light sources 20c and 20d to emit light with supplied power of 70% of rated power.

As described above, the dimming mode executed in the dim-lighting mode differs between before and after the light extinction period. More specifically, supplied power supplied to the first light source and supplied power supplied to the second light source are switched before and after the light extinction period. In other words, the light source shallowly dimmed and the light source deeply dimmed are switched before and after the light extinction period.

With this, it is possible to prevent a specific light source among light sources 20 from being intensively supplied with low supplied power. Accordingly, it is possible to extend the product life of light sources 20. The following describes the reason.

The high-pressure mercury lamp employed as light source 20 according to the present embodiment, during emitting light, causes an electrode material evaporating from an electrode to return to the electrode utilizing the halogen cycle of halogen filled in the arc tube made of glass, to suppress wear of the electrode and to suppress blackening caused by the evaporating electrode material attaching to an inner surface of the arc tube. However, there are instances where the halogen cycle does not sufficiently function when the supplied power is less than 50% of the rated power, leading to possible reduction in the lumen maintenance factor and a product life of light sources, due to wear of the electrode or blackening of the arc tube. In view of the above, it is possible to suppress early deterioration of the product life properties of each of the light sources, by controlling supplied power such that supplied power less than 50% of the rated power is not intensively supplied to a specific light source.

Switching During Lighting Period

In the second mode, controller 30 switches from the first dimming mode to the second dimming mode at a predetermined time period during the light emission period. Detailed description shall be given with reference to an example illustrated in FIG. 8.

In the example illustrated in FIG. 8, projector 10 is powered on at time t10 and the light emission period starts. More specifically, controller 30 causes the four light sources 20a to 20d to emit light with the rated power (i.e., the full-lighting mode).

The dim-lighting mode starts at time t11, and controller 30 executes the first dimming mode. More specifically, controller 30 causes light sources 20a and 20b to emit light with supplied power of 70% of the rated power, and causes light sources 20c and 20d to emit light with supplied power of 30% of the rated power. In other words, the first light sources are light sources 20a and 20b and the second light sources are light sources 20c and 20d.

Controller 30 switches from the first dimming mode to the second dimming mode at time t12. More specifically, subsequent to time t12, controller 30 causes light sources 20a and 20b to emit light with supplied power of 30% of the rated power, and causes light sources 20c and 20d to emit light with supplied power of 70% of the rated power.

It should be noted that time t12 is the time when a predetermined time period T has elapsed since the start of the first dimming mode. More specifically, in this manner, controller 30 switches between the dimming modes every time the predetermined time period T elapses. Time period T is 30 minutes, for example.

Controller 30 switches from the second dimming mode to the first dimming mode at time t13 when the predetermined time period T has elapsed since time t12.

As described above, the dimming mode executed in the dim-lighting mode changes for each passage of the predetermined time period. More specifically, supplied power supplied to the first light source and supplied power supplied to the second light source are switched every time the predetermined time period elapses. In other words, the light source shallowly dimmed and the light source deeply dimmed are switched every time the predetermined time period elapses.

With this, it is possible to prevent a specific light source among light sources 20 from being intensively supplied with low supplied power. In addition, since the dimming mode can be switched every time the predetermined time elapses, it is possible to prevent a specific light source from being intensively supplied with low supplied power even when continuous light emission is performed in the dim-lighting mode for a long period of time. Accordingly, it is possible to extend the product life of light sources 20.

It should be noted that FIG. 7 and FIG. 8 illustrate the cases in each of which two light sources out of the four light sources 20a to 20d are selected as the first light sources and the other two light sources are selected as the second light sources (corresponds to Case 3 in FIG. 4). However, only one light source out of the four light sources 20a to 20d may be selected as the first light source or the second light source (corresponds to Case 4 in FIG. 4).

As illustrated in FIG. 9, controller 30 first starts the first dimming mode at time t21. More specifically, controller 30 causes light source 20a to emit light with supplied power of 70% of the rated power, and causes light sources 20b to 20d to emit light with supplied power of 30% of the rated power.

Controller 30 switches from the first dimming mode to the second dimming mode at time 22 when time period T has elapsed since time t12. More specifically, controller 30 causes light source 20b to emit light with supplied power of 70% of the rated power, and causes light sources 20a, 20c, and 20d to emit light with supplied power of 30% of the rated power Controller 30 switches from the second dimming mode to the third dimming mode at time t23 when time period T has elapsed since time t22. More specifically, controller 30 causes light source 20c to emit light with supplied power of 70% of the rated power, and causes light sources 20a, 20b, and 20d to emit light with supplied power of 30% of the rated power.

Controller 30 switches from the third dimming mode to the fourth dimming mode at time t24 when time period T has elapsed since time t23. More specifically, controller 30 causes light source 20d to emit light with supplied power of 70% of the rated power, and causes light sources 20a to 20c to emit light with supplied power of 30% of the rated power.

As described above, the light source supplied with low supplied power is sequentially changed every time period T elapses. For example, the supplied power supplied to light source 20a and the supplied power supplied to light source 20b are switched between the first dimming mode and the second dimming mode. In other words, light source 20a corresponds to the first light source and light source 20b corresponds to the second light source. Likewise, the supplied power supplied to light source 20b and the supplied power supplied to light source 20c are switched between the second dimming mode and the third dimming mode. In other words, light source 20b corresponds to the first light source and light source 20c corresponds to the second light source. The supplied power supplied to light source 20c and the supplied power supplied to light source 20d are switched between the third dimming mode and the fourth dimming mode. In other words, light source 20c corresponds to the first light source and light source 20d corresponds to the second light source.

With this, it is possible to prevent a specific light source among light sources 20 from being intensively supplied with low supplied power.

[Advantageous Effect, Etc.]

As described above, projector 10 according to the present embodiment includes: a plurality of light sources 20; controller 30 which controls dimming of the plurality of light sources 20 individually; light modulator 40 which synthesizes light emitted from each of the plurality of light sources 20 to generate synthetic light, and modulates the synthetic light to generate an optical image; and projecting optical system 50 which projects the optical image generated by light modulator 40. The plurality of light sources 20 include a first light source and a second light source, and when controller 30 causes the plurality of light sources 20 to emit dimmed light, controller 30 causes the first light source to emit light with supplied power greater than or equal to 50% of rated power and causes the second light source to emit light with supplied power less than 50% of the rated power or turn off.

In this manner, at least one of light sources 20 is caused to emit light with supplied power greater than or equal to 50% of the rated power, and at least one of the other light sources 20 is caused to emit light with supplied power less than 50% of the rated power, thereby suppressing occurrence of flicker and realizing power saving.

In addition, for example, controller 30 may selectively execute (i) a first dimming mode for causing the first light source to emit light with the supplied power greater than or equal to 50% of the rated power and causing the second light source to emit light with the supplied power less than 50% of the rated power or turn off, and (ii) a second dimming mode for causing the second light source to emit light with the supplied power greater than or equal to 50% of the rated power and causing the first light source to emit light with the supplied power less than 50% of the rated power or turn off.

With this, it is possible to prevent a specific light source among light sources 20 from being intensively supplied with low supplied power, enabling extending the product life of light sources 20.

In addition, for example, controller 30 may switch from the first dimming mode to the second dimming mode when controller 30 causes all of the plurality of light sources 20 to turn off and subsequently causes at least one of the plurality of light sources 20 to emit light.

In this manner, during a continuous light emission period from power on to power off of projector 10, it is possible to cause each of light sources 20 to emit light with supplied power greater than or equal to 50% of the rated power and to emit light with supplied power less than 50% of the rated power. Accordingly, it is possible to prevent a specific light source among light sources 20 from being intensively supplied with low supplied power, enabling extending the product life of light sources 20.

In addition, for example, controller 30 may switch from the first dimming mode to the second dimming mode at a predetermined time point during a lighting period in which the plurality of light sources 20 are caused to continuously emit light.

In this manner, it is possible to prevent a specific light source from being intensively supplied with low supplied power even when continuous light emission is performed in the dim-lighting mode for a long period of time. Accordingly, it is possible to extend the product life of light sources 20.

It should be noted that the technique according to the present embodiment can be implemented not only as a projector but also as a program including each operation of the projector as a step, and as a computer-readable recording medium such as a digital versatile disc (DVD) on which the program is recorded.

In other words, the above-described general or specific embodiments may be implemented as a system, an apparatus, an integrated circuit, a computer program, or a computer-readable recording medium, or may be implemented as an arbitrary combination of the system, the apparatus, the integrated circuit, the computer program, and the recoding medium.

[Others]

Although the projector according to the present disclosure has been described based on the above-described embodiment, the present disclosure is not limited to the above-described embodiment.

For example, although the case where projector 10 is a projector of the four-light system or the two-light system has been described in the above-described embodiment, projector 10 is not limited to this example. Projector 10 may be a projector of a six-light system. It is sufficient so long as projector 10 includes a plurality of light sources, and although even numbers of light sources are usually included, three or more of odd numbers of light sources may be included.

Moreover, for example, although the case where controller 30 selectively executes the first dimming mode or the second dimming mode has been described in the above-described embodiment, the dimming mode executed by controller 30 is not limited to this example. It is sufficient so long as controller 30 executes at least one dimming mode. More specifically, among light sources 20, a first light source which is supplied with high supplied power and a second light source which is supplied with low supplied power may be predetermined.

In addition, for example, although light source 20 with the rated power of 310 W has been used in the above-described embodiment, the rated power of light source 20 is not limited to this example. Any rated power, 200 W for instance, may be used for light source 20. In addition, the configurations of light sources 20 may differ among light sources 20. For example, light sources 20 with different rated power may be used.

It should be noted that the present disclosure also includes other forms in which various modifications apparent to those skilled in the art are applied to the embodiment or forms in which structural components and functions in the embodiment are arbitrarily combined within the scope of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A projector comprising:
   a plurality of light sources;
   a controller which controls dimming of the plurality of light sources individually;
   a light modulator which synthesizes light emitted from each of the plurality of light sources to generate synthetic light, and modulates the synthetic light to generate an optical image; and
   a projecting optical system which projects the optical image generated by the light modulator, wherein:
   the plurality of light sources include a first light source and a second light source, and
   when the controller causes the plurality of light sources to emit dimmed light, the controller causes the first light source to emit light with supplied power greater than or equal to 50% of rated power and causes the second light source to emit light with supplied power less than 50% of the rated power or turn off.

2. The projector according to claim 1, wherein the controller causes all of the plurality of light sources to emit light with supplied power greater than or equal to 5% of the rated power.

3. The projector according to claim 1, wherein the controller causes the first light source to emit light with supplied power greater than or equal to 65% of the rated power.

4. The projector according to claim 1, wherein the controller causes the second light source to emit light with supplied power in a range from 20% to 40% of the rated power.

5. The projector according to claim 1, wherein the plurality of light sources include one of a high-pressure mercury lamp, a metal halide lamp and a xenon lamp.

6. A projector comprising:
   a plurality of light sources;
   a controller which controls dimming of the plurality of light sources individually;
   a light modulator which synthesizes light emitted from each of the plurality of light sources to generate synthetic light, and modulates the synthetic light to generate an optical image; and
   a projecting optical system which projects the optical image generated by the light modulator, wherein:
   the plurality of light sources include a first light source and a second light source, and
   the controller selectively executes (i) a first dimming mode for causing the first light source to emit light with the supplied power greater than or equal to 50% of rated power and causing the second light source to emit light with the supplied power less than 50% of rated power or turn off, and (ii) a second dimming mode for causing the second light source to emit light with the supplied power greater than or equal to 50% of the rated power and causing the first light source to emit light with the supplied power less than 50% of the rated power or turn off.

7. The projector according to claim 6, wherein
the controller switches from the first dimming mode to the second dimming mode when all of the plurality of light sources are turned off and subsequently at least one of the plurality of light sources is turned on to emit light.

8. The projector according to claim 6, wherein
the controller switches from the first dimming mode to the second dimming mode at a predetermined time point during a lighting period in which the plurality of light sources are caused to continuously emit light.

9. The projector according to claim 6, wherein the plurality of light sources include one of a high-pressure mercury lamp, a metal halide lamp and a xenon lamp.

* * * * *